(12) United States Patent
Ying et al.

(10) Patent No.: US 7,009,852 B2
(45) Date of Patent: Mar. 7, 2006

(54) DC-DC CONVERTER CIRCUITS AND METHOD FOR REDUCING DC BUS CAPACITOR CURRENT

(75) Inventors: Jianping Ying, Taoyuan Shien (TW); Qingyou Zhang, Taoyuan Shien (TW); Aibin Qiu, Taoyuan Shien (TW); Teng Liu, Taoyuan Shien (TW); Xingkuan Guo, Taoyuan Shien (TW); Jianhong Zeng, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 49 days.

(21) Appl. No.: 10/903,154

(22) Filed: Jul. 30, 2004

(65) Prior Publication Data

US 2005/0024028 A1 Feb. 3, 2005

(30) Foreign Application Priority Data

Jul. 30, 2003 (TW) .............................. 92120922 A

(51) Int. Cl.
*H02M 3/335* (2006.01)
(52) U.S. Cl. ........................... 363/17; 363/98; 323/266
(58) Field of Classification Search ............ 363/15–17, 363/80, 97, 98, 132; 323/222–225, 266, 323/271
See application file for complete search history.

(56) References Cited

U.S. PATENT DOCUMENTS

| | | | | |
|---|---|---|---|---|
| 5,019,952 A | * | 5/1991 | Smolenski et al. | ........... 363/16 |
| 6,069,809 A | * | 5/2000 | Inoshita | ........................ 363/98 |
| 6,898,093 B1 | * | 5/2005 | Ambo et al. | ............. 363/56.05 |
| 6,949,915 B1 | * | 9/2005 | Stanley | ........................ 323/207 |

* cited by examiner

*Primary Examiner*—Gary L Laxton
(74) *Attorney, Agent, or Firm*—Volpe and Koenig, P.C.

(57) ABSTRACT

An apparatus for reducing the heat losses caused by the DC Bus capacitor current is proposed. The apparatus includes: a double frequency boost converter circuit having two boost converter circuits coupled in parallel, in which two switches, respectively disposed on the two boost converter circuits, are turned on and off alternately to produce an output current having a frequency twice that of control signals of the two switches, and to offer a DC bus respectively, a full-bridge DC-DC converter coupled to an output terminal of the double frequency boost converter circuit for transforming an output of the DC bus to a DC voltage, and a DC bus capacitor coupled to the double frequency boost converter circuit and the full-bridge DC-DC converter in parallel for balancing two corresponding transient powers of the double frequency boost converter circuit and the full-bridge DC-DC converter respectively.

11 Claims, 16 Drawing Sheets iin ic=iin-io

DC-DC CONVERTER CIRCUITS AND METHOD FOR REDUCING DC BUS CAPACITOR CURRENT

FIELD OF THE INVENTION

The present invention relates to the apparatus and the method for reducing the heat losses caused by the DC Bus capacitor current. More specifically, this invention relates to the proposed DC-DC converter circuits having relatively lower DC Bus capacitor current and the method so as to decrease the heat losses and to improve the efficiency.

BACKGROUND OF THE INVENTION

For the power converters, usually the multi-stage circuit configurations would be employed when the reliability and the simplicity of production are under consideration. The aforementioned multi-stage configurations almost always have the DC Bus, and the DC Bus usually is coupled to a capacitor having a relatively high capacitance in parallel. For example, usually the two-stage configuration having a DC Bus would be employed in the power source of the communication system. Usually, the front-end is a power factor correction (PFC) circuit, the back-end is a DC-DC converter, and the DC Bus is coupled between the two stages. The PFC circuit of the front-end would turn the AC input voltage into a DC output voltage, and the DC output voltage is sent to the DC Bus. The DC-DC converter of the back-end would input the current from the DC Bus. When the circuit is working under a steady state, the mean value of the input currents of the DC Bus equals to the mean value of the output currents of the DC Bus, but the transient currents of the two are different. Which means a capacitor must be coupled to the DC Bus in parallel for allowing the AC current to pass only so as to balance the transient powers between the two stages.

In general, the capacitor occupies a relatively large volume in a power converter and the cost of the capacitor is relatively high. Due to the unique features of the capacitor, the temperature rising during its operations should be kept at a relatively lower level to endure its life span. There are two reasons for the temperature rising of the capacitor: 1. The AC current will have losses on the capacitor equivalent series resistance (ESR) resistor, and 2. The influences come from the temperature of the environments and the heat dissipating conditions, and the influences of the other heat-generating elements are also included. Since the power densities of the converters are rising, the relatively larger volume and the heat-dissipating problems of the capacitors have become more and more important. The operational status of the DC Bus capacitor in the power source of the traditional communication system and the heat-dissipating resolutions in the prior arts are described as follows.

Using the power source of the traditional communication system as an example, the operational status of the DC Bus capacitor is described firstly. Please refer to FIG. 1, it shows the schematic circuit diagram of the typical power source of the communication system. In which, the power factor correction (PFC) unit is composed by the input rectified voltage $V_{in}$, the inductor L, the power diode D, the power switch S, and the DC Bus capacitor $C_I$, The phase-shifted full-bridge DC-DC converter is composed by the DC Bus capacitor $C_I$, the power switches $S_1$–$S_4$, the capacitor $C_b$, the inductor $L_s$, the transformer, and the output rectifying and filtering unit. The detailed operational procedures of the PFC circuit and the phase-shifted full-bridge DC-DC converter are not discussed here. Among which, the frequency of the output power of the phase-shifted full-bridge DC-DC converter is twice of its switching frequency, and the frequency of the input current of this stage is also twice of its switching frequency.

In FIG. 1, $C_I$ is the DC Bus capacitor, and it is usually a capacitor having a relatively large capacitance. Due to the differences between the frequencies and the amplitudes of the output current $i_{in}$ of the front-end and the input current $i_o$ of the back-end, there is an AC current $I_C$ which flows through the capacitor $C_I$. As for the power-level, the output power of the back-end is a constant, which means that the input current $i_o$ mainly has the DC component except for the high frequency component. Theoretically, the output current of the front-end PFC unit mainly includes the 100 HZ component, and the high switching-frequency component is also included. The difference between the currents of the output of the front-end and the input of the back-end is the DC Bus capacitor current, which mainly has the 100 Hz component and the component around the switching frequency. When the input/output conditions of the converter are fixed, the 100 HZ component of the capacitor current is also fixed.

Assume that the input voltage of the PFC unit is 176 $V_{rms}$, the switching frequency is 45 KHZ, the DC Bus voltage is 360V, and the input current of the back-end is 8.33 $A_{pk}$ (7.5 A in average), the duty ratio is 0.9, the output voltage is 54V, the output current is 50 A, and the switching frequency is 80 KHZ. These pre-assumptions are set for the typical 3000 W/48 V/50 A power source of the communication system, which is operated under the poor operational conditions, and has certain representative features.

According to the above-mentioned pre-assumptions, the steady state waveforms of the DC Bus capacitor current are shown in FIGS. 2(a)–2(c). In which, the left-hand side waveform diagrams are the partial enlargements of the right-hand side operational frequency versus time period diagrams respectively. The waveform as shown in FIG. 2(a) is the waveform of the current flowing from the diode to the DC Bus, $i_{in}$, and the envelope of which is a sinusoidal half-wave. The average value of the current $i_{in}$ is equal to the average value of the current $i_o$ (the waveform of $i_o$ is shown in FIG. 2(b)). The difference between $i_{in}$ and $i_O$ is shown in FIG. 2(c). In which, there are high frequency current ripples and the 100 HZ current components, and there is no DC component theoretically. When the load of the back-end is relatively large, the high frequency ripples are relatively large since the current flowing from the front-end to the DC Bus is a pulse wave and the amplitudes of the pulse wave are relatively larger.

Please refer to FIG. 3, it shows the frequency spectrum analysis diagram of the current flowing through the DC Bus capacitor (see FIG. 2(c)). In which, there are high frequency components around the front-end switching frequency. The effective value of the current of 100 HZ is 5.304 A, the effective value of the current above 100 HZ is 7.749 A, and the total effective value of the current is 9.389 A. When the high frequency component of the current is relatively too high, the effective value of the total current will be increased.

In the prior art, in order to solve the heat-dissipating problem, usually the number or the volume of the capacitor is increased to decrease the capacitor ESR resistor so as to decrease the losses. This method is quite simple, but the volume of the system is increased, and the power density of the converter is decreased. The other alternative is to increase the heat-dissipating capability of the capacitor, for example, increase the wind-force of the system etc. The second method has certain effects, but it is limited when the system is operated under the relatively high-temperature environments.

The present invention resolves the heat-dissipating problem of the DC Bus capacitor through decreasing the heat generated. If the current flowing through the capacitor can be decreased effectively, the heat generated by the capacitor would be decreased.

Keeping the drawbacks of the prior arts in mind, and employing experiments and research full-heartily and persistently, the DC-DC converter circuits and the method for reducing the DC Bus capacitor current are finally conceived by the applicants.

SUMMARY OF THE INVENTION

It is therefore an object of the present invention to propose the apparatus and the method for reducing the heat losses caused by the DC Bus capacitor current.

It is therefore another object of the present invention to propose the DC-DC converter circuits having relatively lower DC Bus capacitor current and the method so as to decrease the heat losses caused by the DC Bus capacitor current and to improve the efficiency of the DC-DC converter circuits.

According to the first aspect of the present invention, the DC-DC converter circuit for reducing a DC bus capacitor current, includes: a double frequency boost converter circuit having two boost converter circuits electrically connected in parallel, wherein two switches respectively disposed on the two boost converter circuits are turned on and off alternately to produce an output current having a frequency twice that of control signals of the two switches, and to offer a DC bus respectively, a full-bridge DC-DC converter connected to an output terminal of the double frequency boost converter circuit for transforming an output of the DC bus to a DC voltage, and a DC bus capacitor electrically connected to the double frequency boost converter circuit and the full-bridge DC-DC converter in parallel for balancing two corresponding transient powers of the double frequency boost converter circuit and the full-bridge DC-DC converter respectively.

Preferably, the double frequency boost converter circuit includes: a first boost converter circuit, including: a first inductor having a first terminal electrically connected to a first terminal of a DC power source, a first diode having an anode electrically connected to a second terminal of the first inductor, and a first switch having a first terminal electrically connected to the second terminal of the first inductor, and a second terminal electrically connected to a second terminal of the DC power source, and a second boost converter circuit, including: a second inductor having a first terminal electrically connected to the first terminal of the DC power source, a second diode having an anode electrically connected to a second terminal of the second inductor, and a second switch having a first terminal electrically connected to the second terminal of the second inductor, and a second terminal electrically connected to the second terminal of the DC power source.

Preferably, the first and the second switches are alternately turned on and off with a difference of 180 degrees phase angles.

Preferably, the full-bridge DC-DC converter is one of a phase-shifted full-bridge DC-DC converter and a non-phase-shifted full-bridge DC-DC converter.

According to the second aspect of the present invention, the DC-DC converter circuit for reducing a DC bus capacitor current includes: a double frequency PFC circuit having two PFC circuits electrically connected in parallel, wherein two switches respectively disposed on the two boost converter circuits are turned on and off alternately to produce an output current having a frequency twice that of control signals of the two switches, and to offer a DC bus, a full-bridge DC-DC converter connected to an output terminal of the double frequency PFC circuit for transforming an output of the DC bus to a DC voltage, and a DC bus capacitor electrically connected to the double frequency PFC circuit and the full-bridge DC-DC converter in parallel for balancing two corresponding transient powers of the double frequency PFC circuit and the full-bridge DC-DC converter respectively.

Preferably, the first and the second switches are alternately turned on and off with a difference of 180 degrees phase angles.

Preferably, the full-bridge DC-DC converter is one of a phase-shifted full-bridge DC-DC converter and a non-phase-shifted full-bridge DC-DC converter.

According to the third aspect of the present invention, the method for reducing a DC bus capacitor current of a DC-DC converter circuit, in which the DC-DC converter circuit includes a full-bridge DC-DC converter electrically connected to a DC bus for transforming an output of the DC bus to a DC voltage and a DC bus capacitor electrically connected to the full-bridge DC-DC converter in parallel, includes the step of: employing an output current of the DC bus having a frequency twice a switching frequency of the DC-DC converter to reduce the DC bus capacitor current.

Preferably, the full-bridge DC-DC converter is one of a phase-shifted full-bridge DC-DC converter and a non-phase-shifted full-bridge DC-DC converter.

According to the fourth aspect of the present invention, the DC-DC converter circuit for reducing a DC bus capacitor current includes: an n-tuple frequency boost converter circuit having n boost converter circuits electrically connected in parallel, in which n switches respectively disposed on the n boost converter circuits are turned on and off alternately to produce an output current having a frequency n times that of control signals of the n switches, and to offer a DC bus, a full-bridge DC-DC converter electrically connected to an output terminal of the n-tuple frequency boost converter circuit for transforming an output of the DC bus to a DC voltage, and a DC bus capacitor electrically connected to the n-tuple frequency boost converter circuit and the full-bridge DC-DC converter in parallel for balancing two corresponding transient powers of the n-tuple frequency boost converter circuit and the full-bridge DC-DC converter respectively.

According to the fifth aspect of the present invention, the DC-DC converter circuit for reducing a DC bus capacitor current includes: an n-tuple frequency PFC circuit having n PFC circuits electrically connected in parallel, in which n switches respectively disposed on the n PFC circuits are turned on and off alternately to produce an output current having a frequency n times that of control signals of the n switches, and to offer a DC bus, a full-bridge DC-DC converter connected to an output terminal of the n-tuple frequency PFC circuit for transforming an output of the DC bus to a DC voltage, and a DC bus capacitor electrically connected to the n-tuple frequency PFC circuit and the full-bridge DC-DC converter in parallel for balancing two corresponding transient powers of the n-tuple frequency PFC circuit and the full-bridge DC-DC converter respectively.

The present invention may best be understood through the following descriptions with reference to the accompanying drawings, in which:

DETAILED DESCRIPTION OF THE PREFERRED EMBODIMENT

Figure 1:
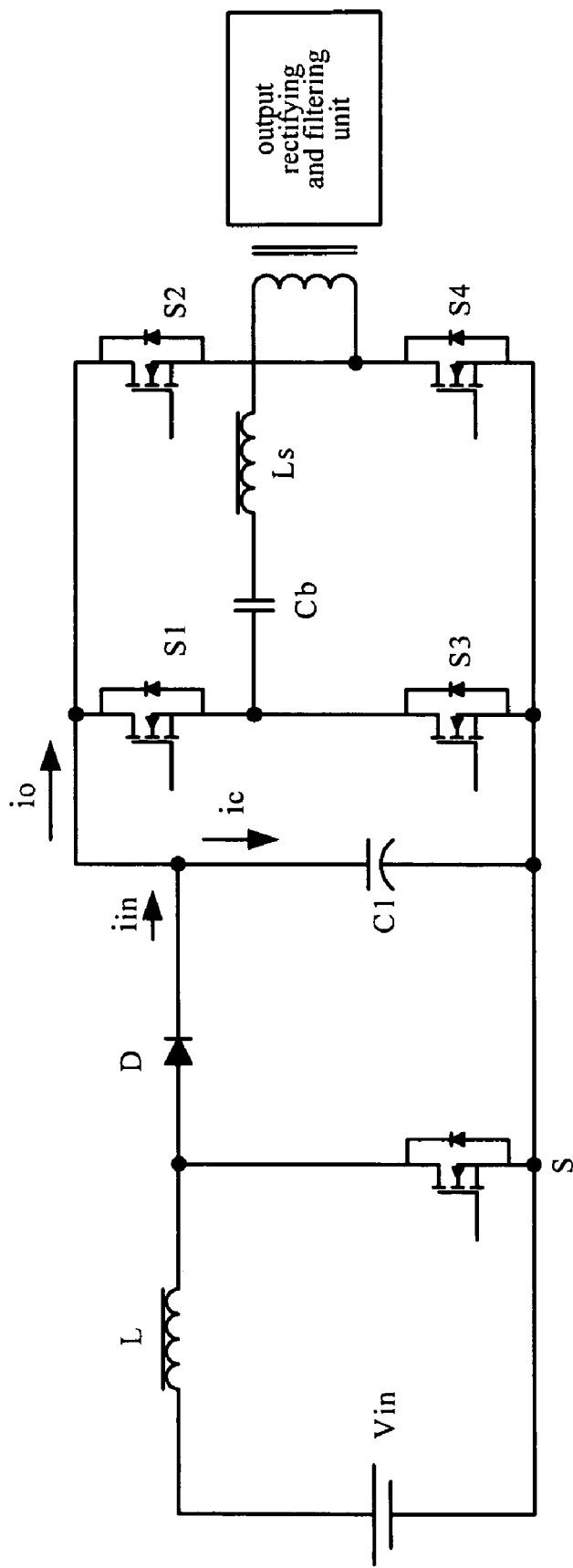
FIG. 1 is the schematic circuit diagram of a traditional power source of the communication system in the prior art.
Figure 4:
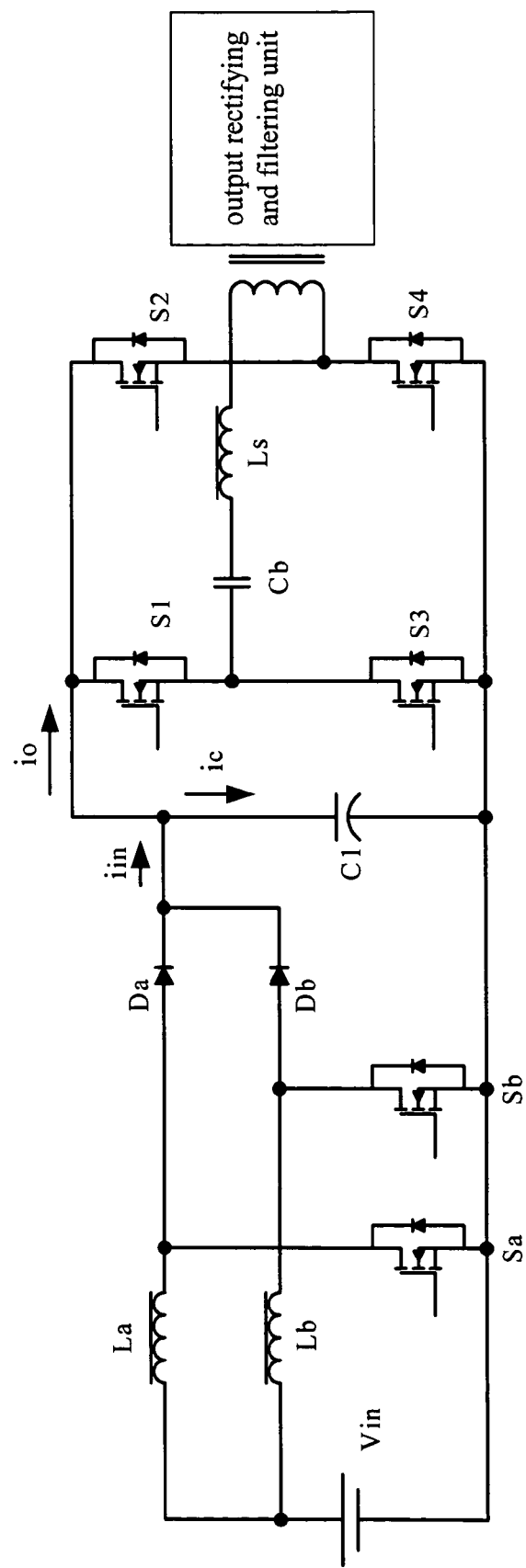
FIG. 4 is the schematic circuit diagram of the main circuit configuration of the first preferred embodiment having the double-frequency PFC circuit in the front-end and the phase-shifted full-bridge DC-DC converter in the back-end of the present invention.

To decrease the DC Bus capacitor current, the present invention improves the topology design of the multi-stage converter. The main circuit configuration having the double-frequency PFC circuit in the front-end and the phase-shifted full-bridge DC-DC converter in the back-end is proposed in the present invention as shown in FIG. 4. In which, the back-end of the system employs the same circuit as shown in FIG. 1, the main difference between the two is that the PFC circuit in the front-end is improved from a single configuration to the dual configuration. In FIG. 4, the $V_{in}$, the inductors La and Lb, the power switches $S_a$ and $S_b$, the power diodes $D_a$ and $D_b$, and the DC Bus capacitor $C_1$ constitute the PFC unit. The elements $L_a$, $S_a$, and $D_a$ correspond to the elements $L_b$, $S_b$, and $D_b$, and each group respectively forms an independent unit. The main operational principles of the proposed circuit are: 1. There is a difference of 180 degrees between corresponding phase angles of the control signals of the two switches $S_a$ and $S_b$ respectively, that is a half switching period, 2. The positive sinusoidal half-wave currents flow through both of the inductors $L_a$ and $L_b$, and these two currents can be equalized through controlling. The operational principles of the double-frequency boost converters are discussed in the prior arts and are skipped for the time being.

The operational principles employed by the proposed main circuit configuration to decrease the DC Bus capacitor current are described as follows. Viewing from the back-end, the frequency of the input current of the phase-shifted full-bridge DC-DC converter is twice that of its switching frequency. When the duty ratio is relatively higher, the current ripples are relatively lower. Since the double-frequency techniques are employed in the front-end, thus the output current of the front-end, which is the input current of the DC Bus capacitor, has the three power-level effects so as to snub the input current ripples of the DC Bus. Since both the input/output current ripples are relatively smaller, the total effect is that the high-frequency ripples of the DC Bus capacitor become relatively smaller. Finally, the effective value of the DC Bus capacitor current will be decreased. The effectiveness of the proposed circuit is validated through the following real examples.

Figure 2A:
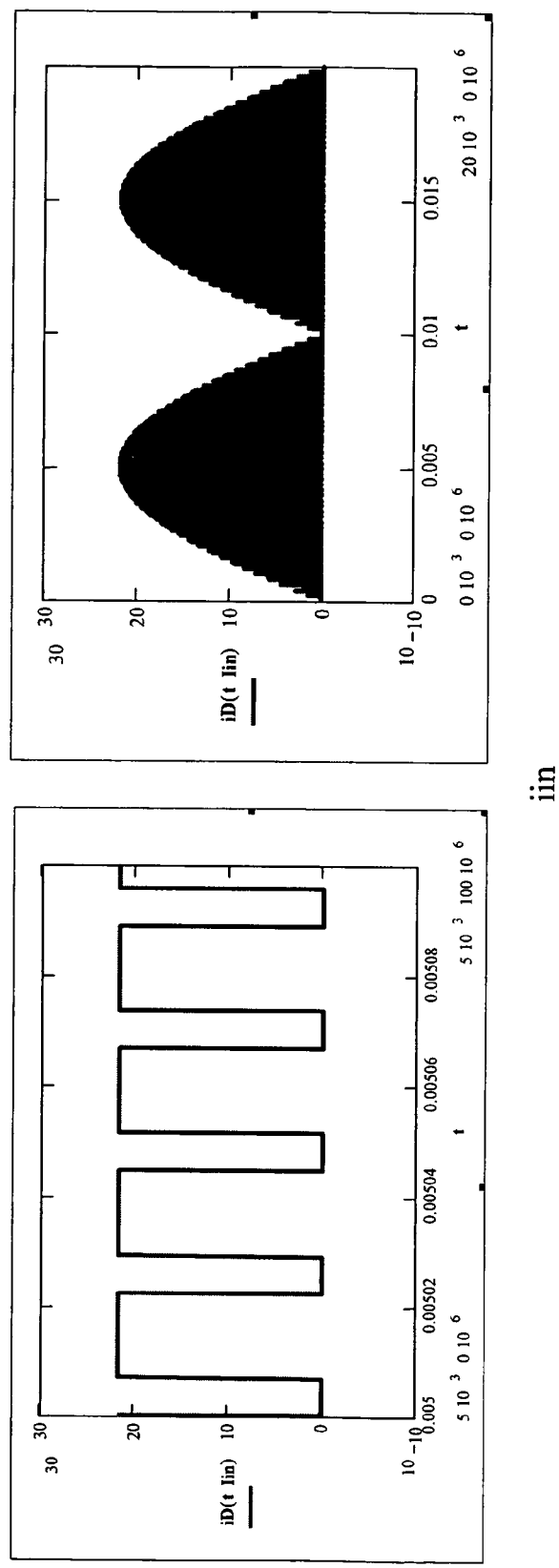
FIGS. 2(a)–2(c) are the waveform diagrams of the steady-state DC Bus capacitor current of the traditional power source of the communication system in the prior art.
Figure 2B:
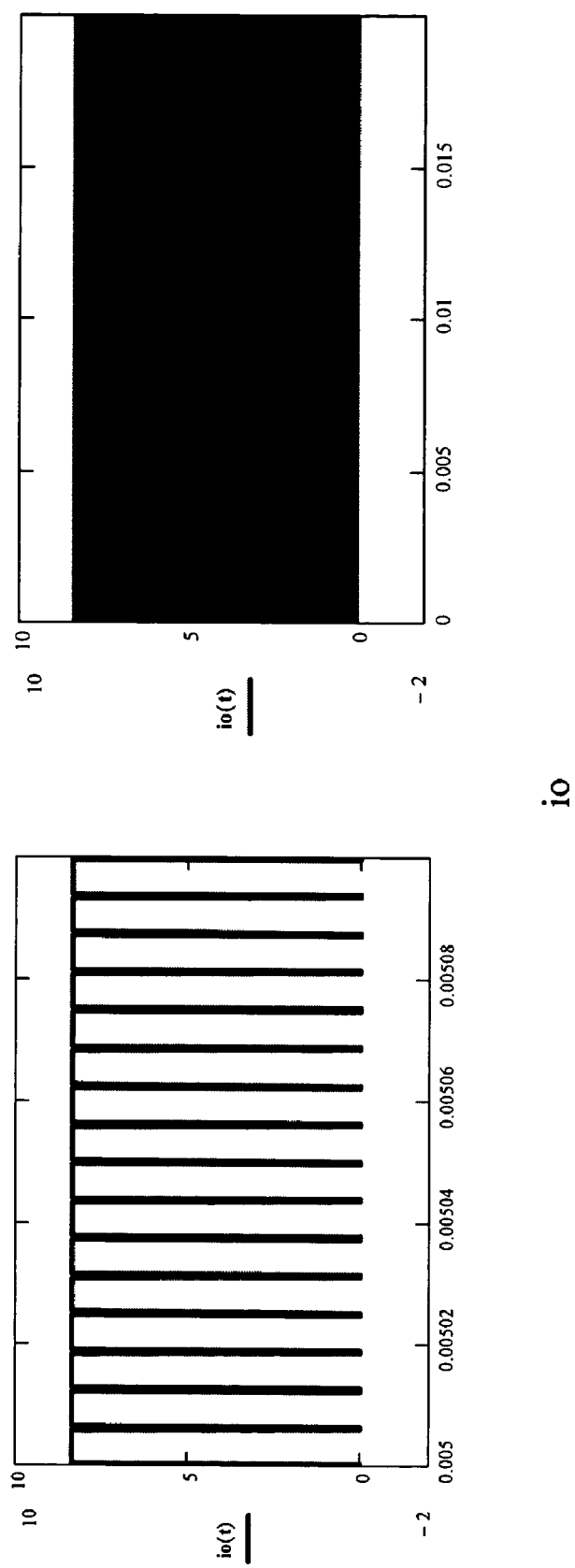
Figure 2C:
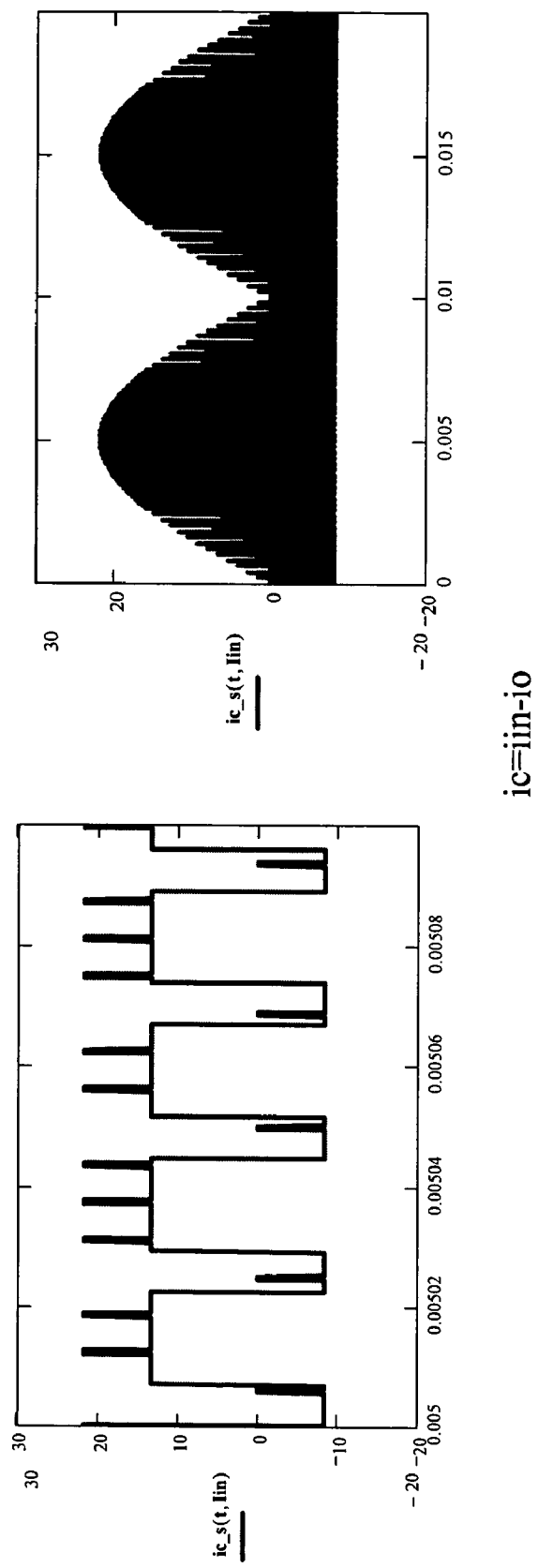
Figure 5A:
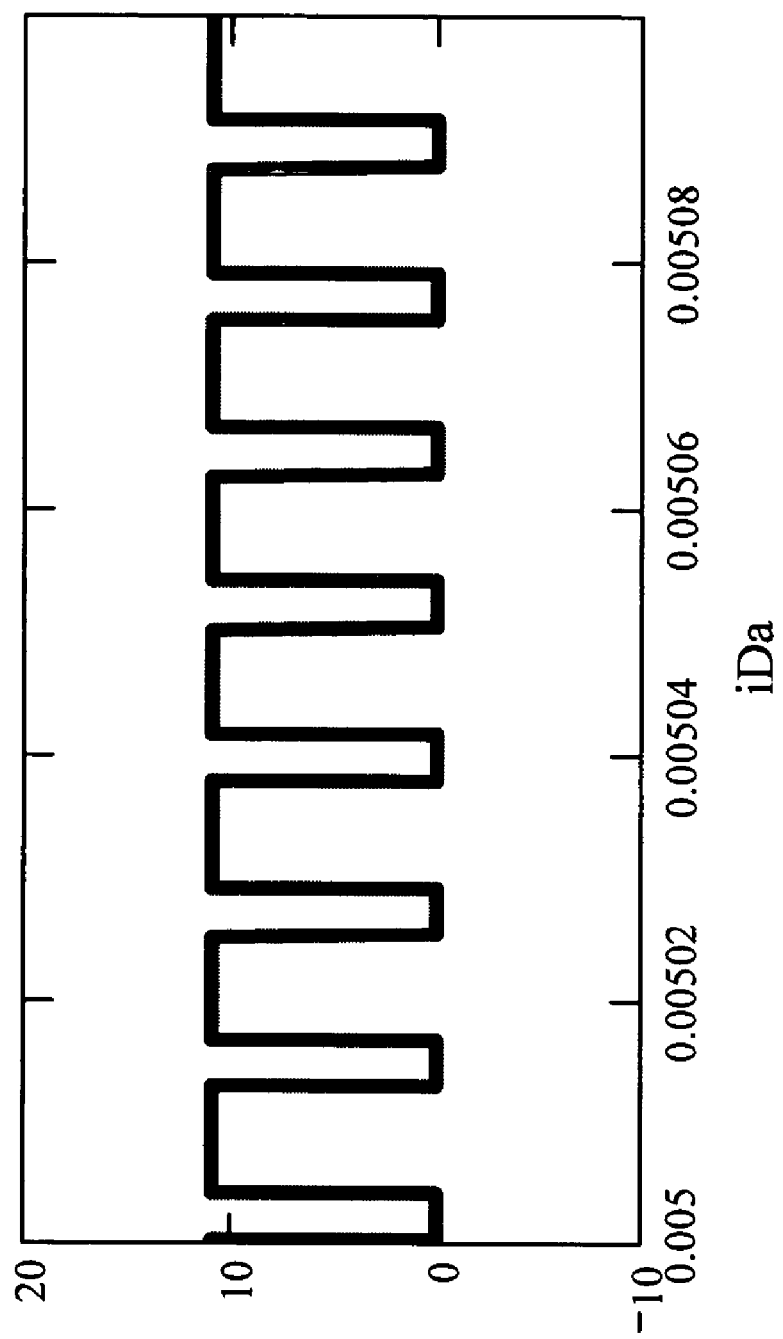
FIGS. 5(a)–5(d) are the waveform diagrams of the current flowing from the output of the front-end to the DC Bus of FIG. 4.
Figure 5B:
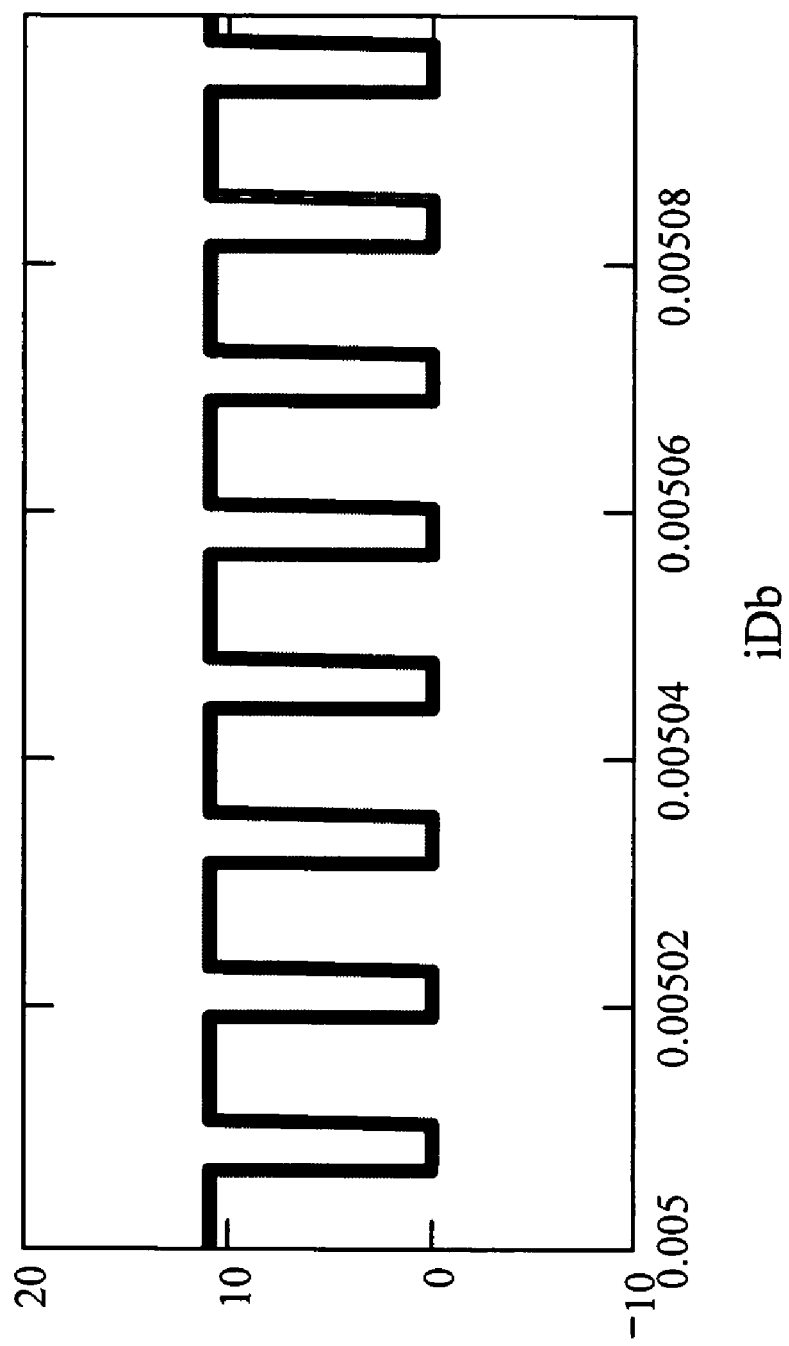
Figure 5C:
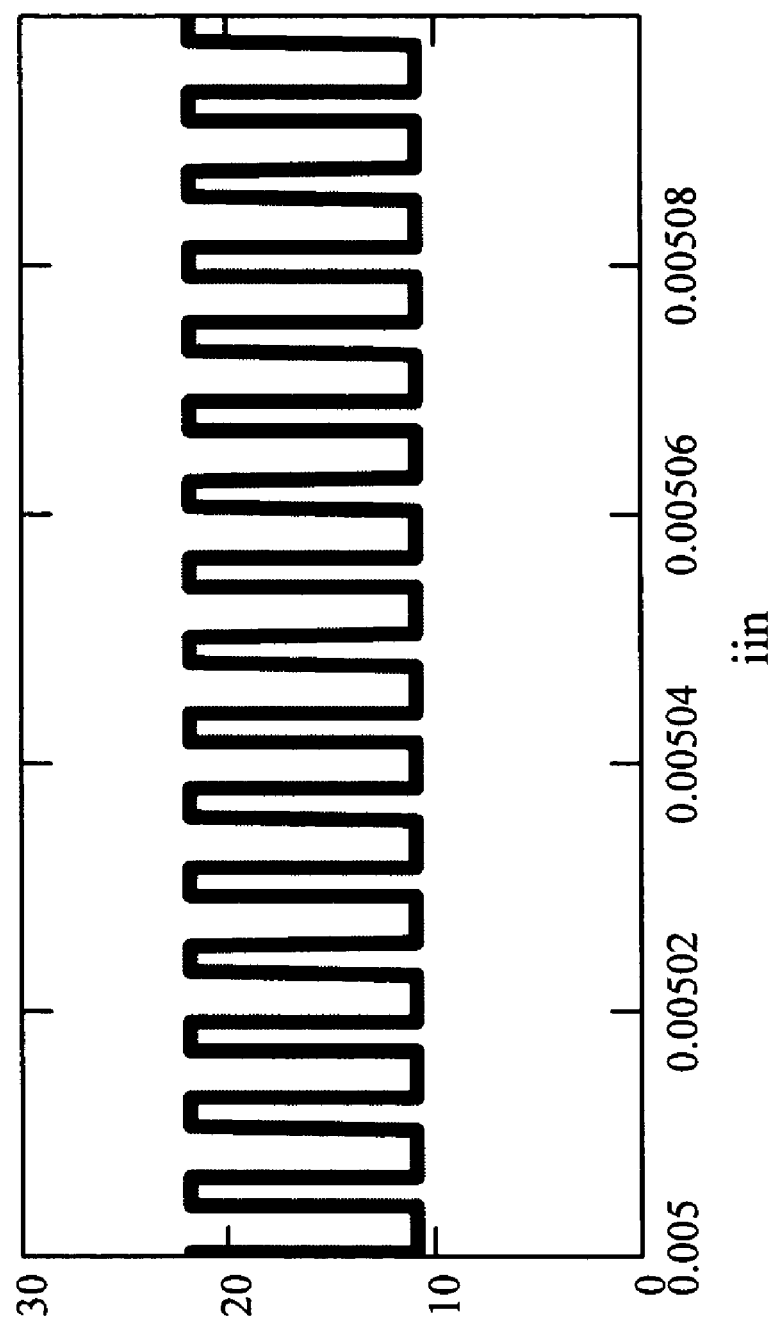
Figure 5D:
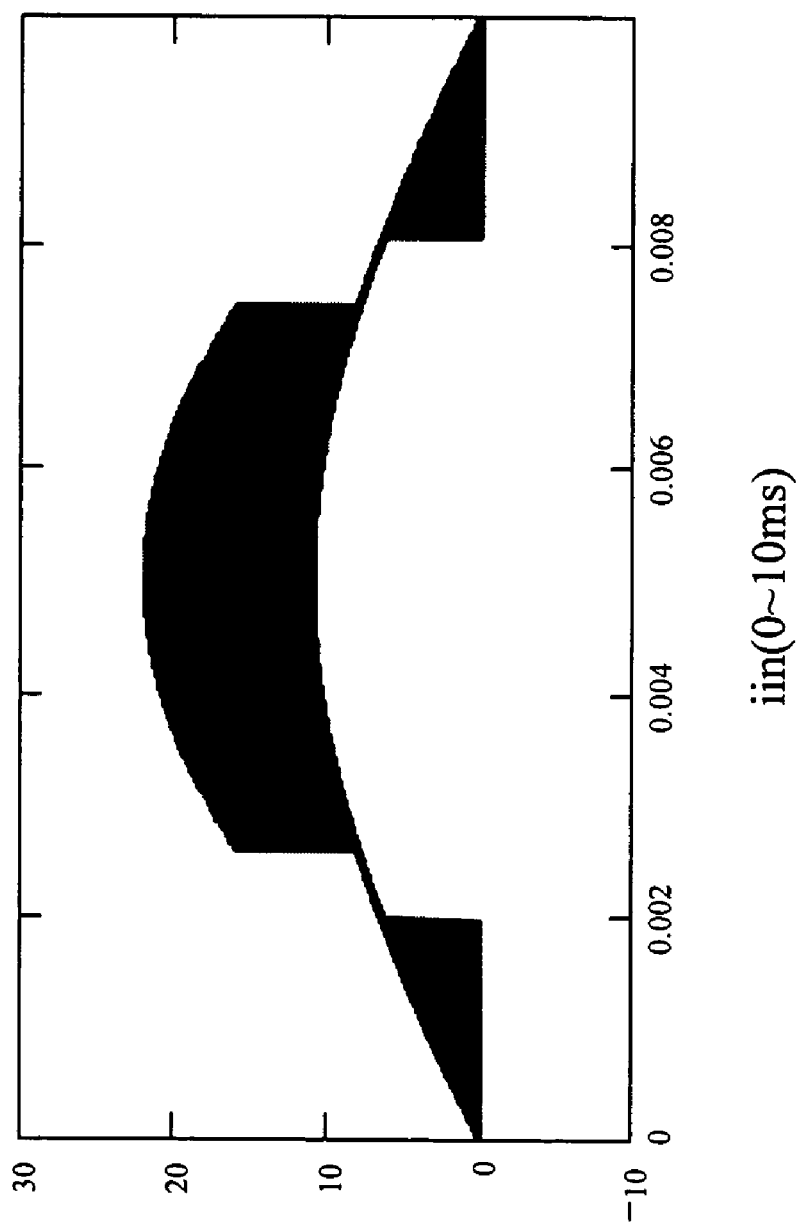

Please refer to FIGS. 5(a)–5(d), in which the waveforms of the current from the output of the front-end to the DC Bus are shown. In FIGS. 5(a) and 5(b), respectively the waveforms of the currents flowing through the diodes $D_a$ and $D_b$ are shown. The sum of the currents flowing through the diodes $D_a$ and $D_b$, that is $I_{in}$, is shown in FIG. 5(c). Referring to FIG. 5(d), it shows the waveforms of the half-period wave of $I_{in}$. As seen in FIG. 5(d), the waveform of $I_{in}$ has been changed dramatically. Referring to FIG. 5(d), the transient current waveform is totally different from that of the FIG. 2(a), the pulse component is decreased dramatically. The conditions for deriving the waveform of FIG. 5(d) are the same as those of the input/output conditions of the converter corresponding to FIG. 2(a), and the switching frequencies of the two units of the dual PFC circuit are both 45 KHZ.

Figure 3:
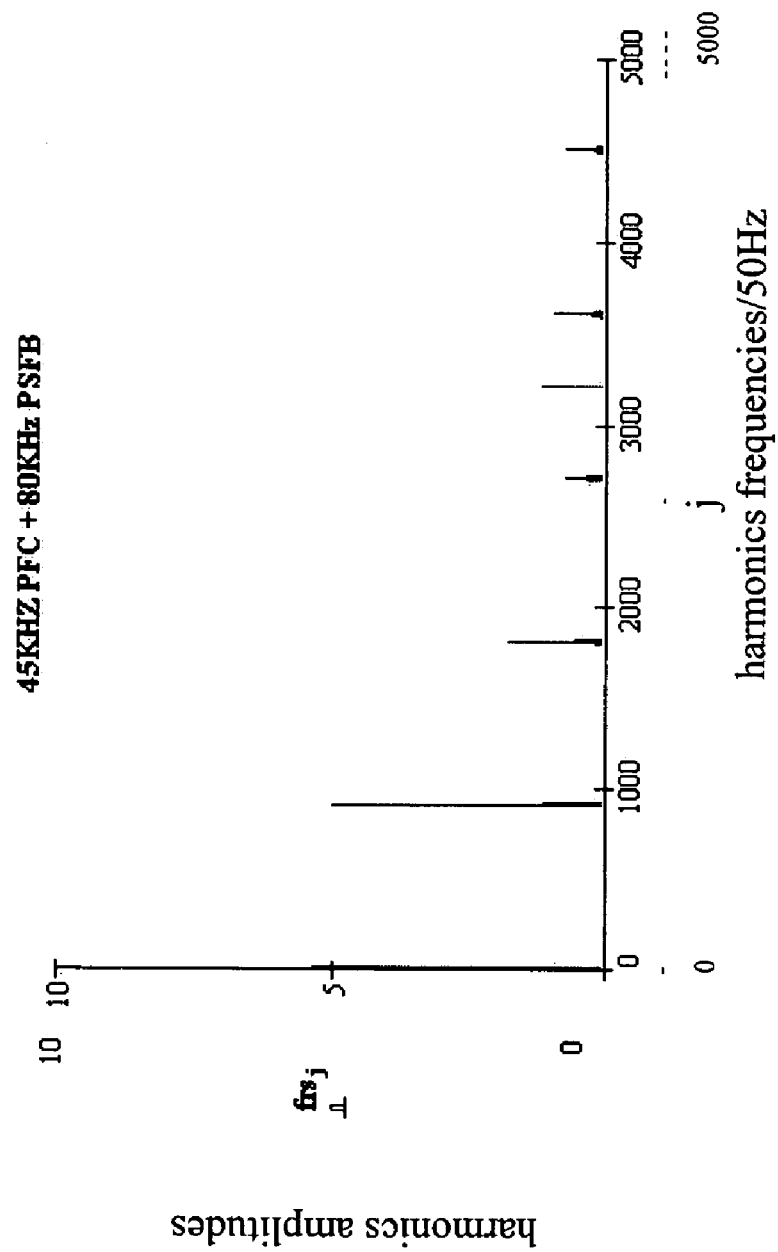
FIG. 3 is the frequency spectrum analysis diagram of the DC Bus capacitor current as shown in FIG. 2(c)
Figure 6A:
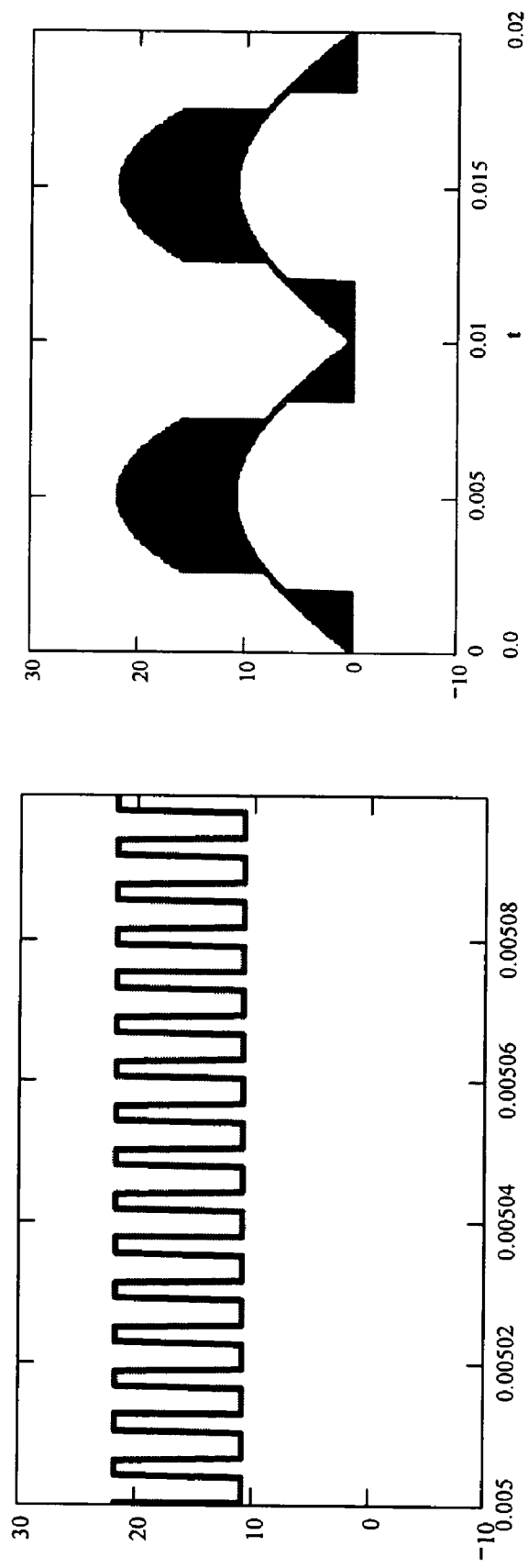
FIGS. 6(a)–6(c) are the waveform diagrams of the steady-state DC Bus capacitor current of FIG. 4.
Figure 6B:
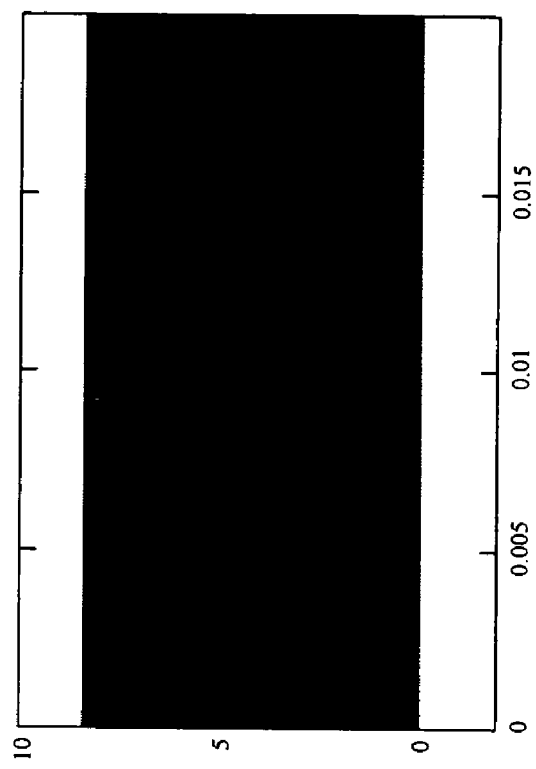
Figure 6B:
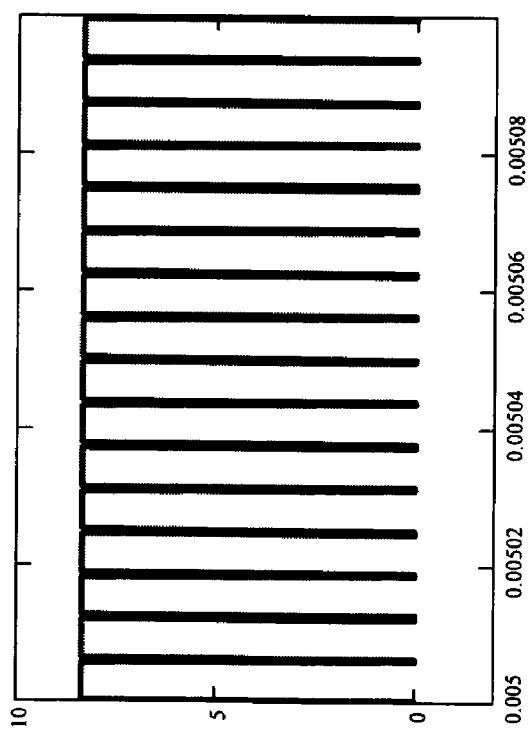
Figure 6C:
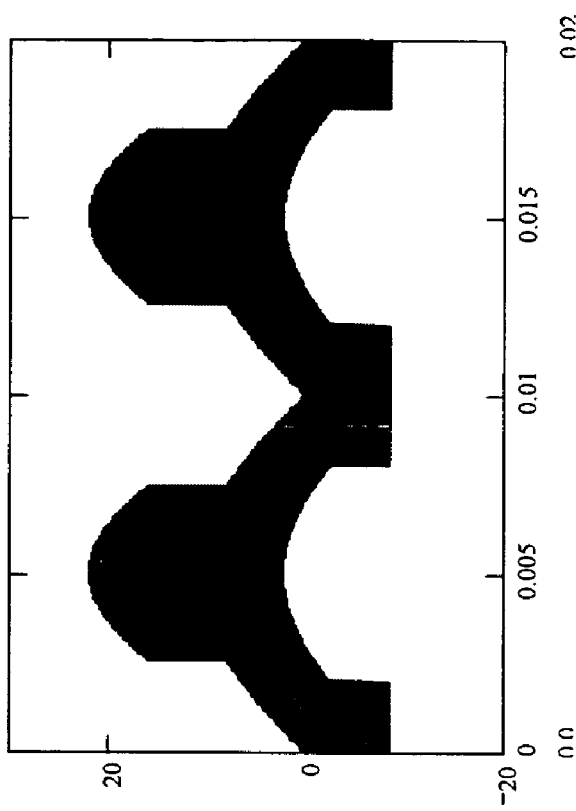
Figure 6C:
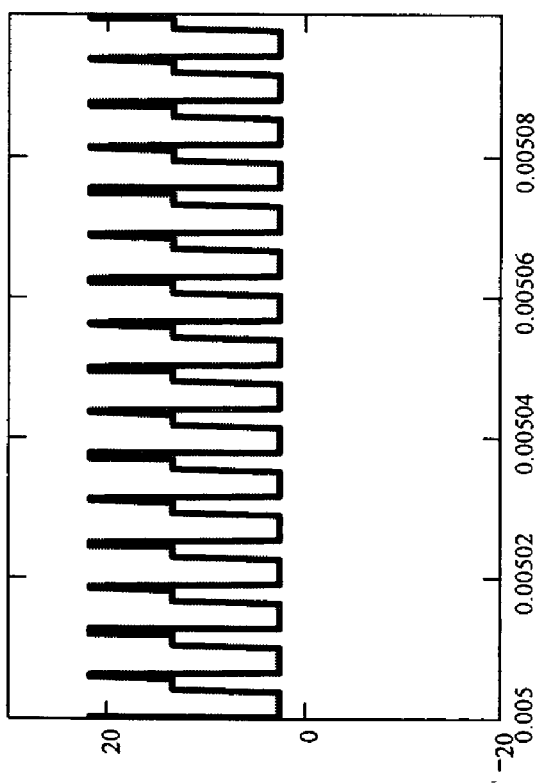
Figure 7:
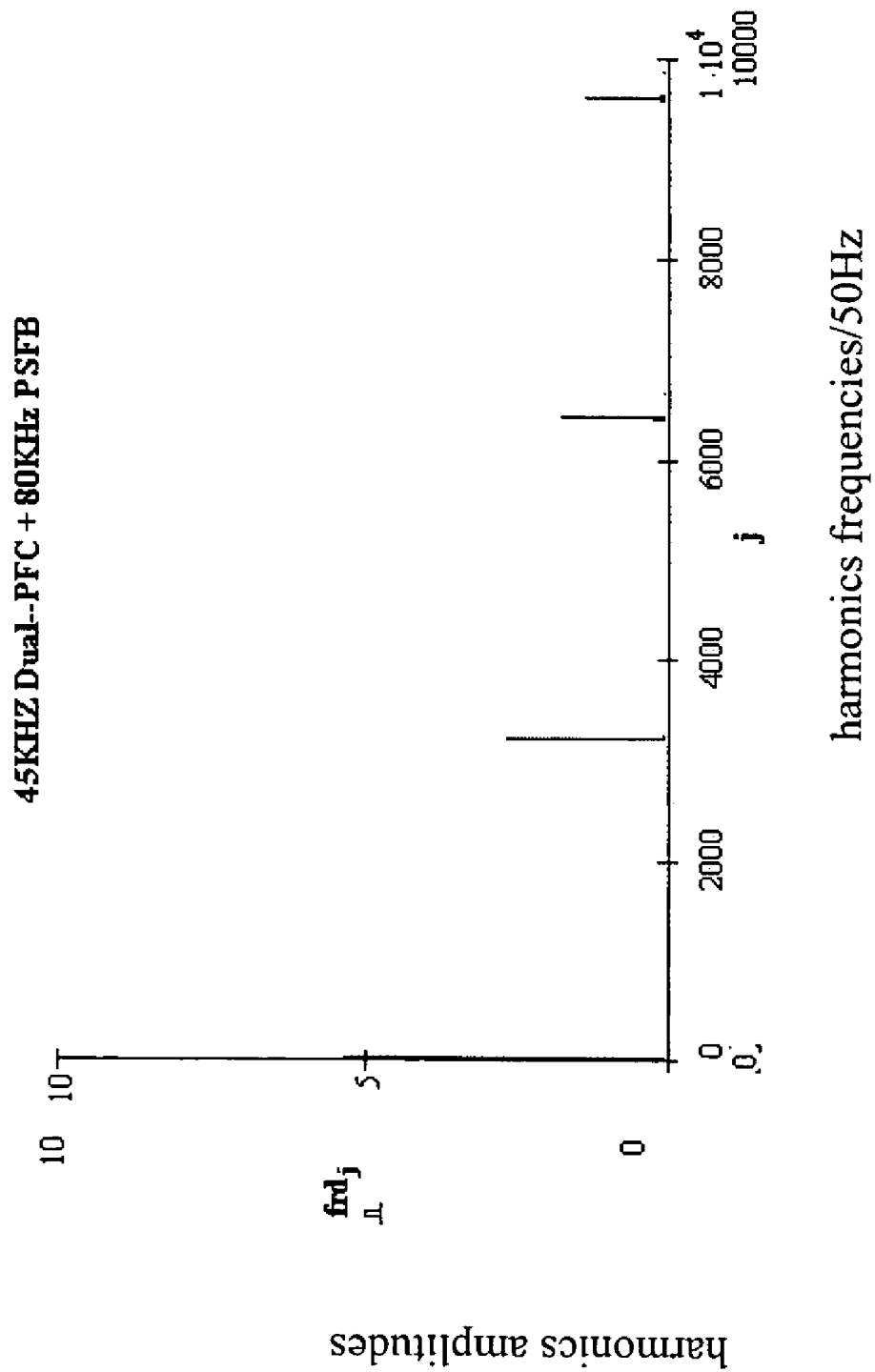
FIG. 7 is the frequency spectrum analysis diagram of the DC Bus capacitor current as shown in FIG. 6(c)

According to the analysis of the waveform of the current $I_{in}$, the waveform of the DC Bus capacitor current can be generated (as shown in FIG. 6(c)). As seen in FIG. 6(c), the high frequency ripples of the DC Bus capacitor current are decreased. In FIG. 7, the corresponding frequency spectrum analysis diagram of the waveforms of FIG. 6(c) is shown. Comparing FIG. 7 and FIG. 3, the ripples of the DC Bus capacitor current in FIG. 7 are decreased remarkably due to the employment of the double-frequency PFC circuit. The relative data are as follows: the effective value of the current of 100 HZ is 5.304 A, the effective value of the current above 100 HZ is 4.821 A, and the total effective value of the current is 7.167 A. Comparing these results and the relative results as shown in FIG. 3, the current component of 100 HZ is not changed, but the effective value of the high frequency component of the current has dropped from 7.749 A to 4.821 A, and the total effective value of the current has dropped from 9.389 A to 7.167 A. Assume that the capacitor ESR resistors under the two different circumstances are the same, the ratio of losses of the latter one versus the former one is: 7.1672/9.3892=58.3%. Due to the employment of the double-frequency technique, the loss of the capacitor has dropped 41.7%, so the effect is relatively quite good.

Figure 8:
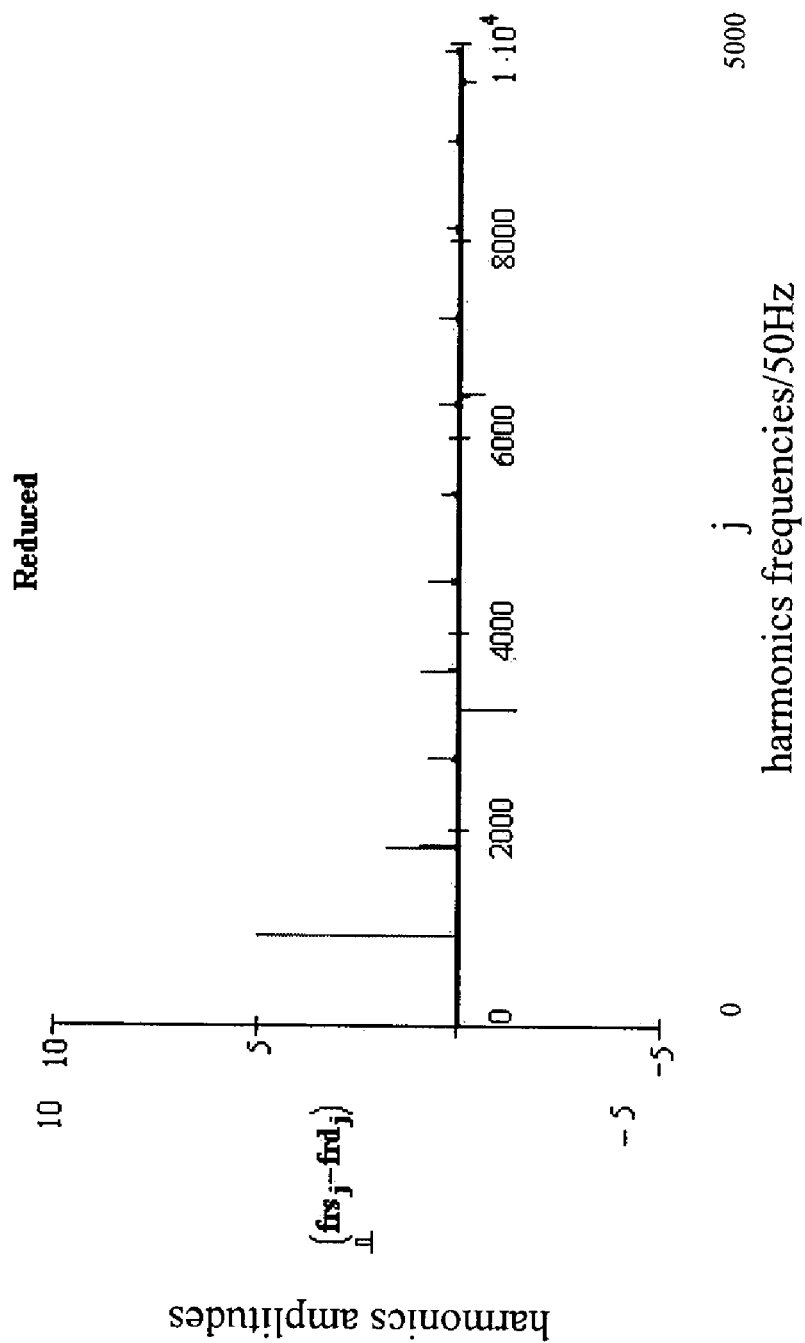
FIG. 8 is the frequency spectrum analysis diagram of the decreasing amount of the DC Bus capacitor current through employing the double-frequency technique.

Referring to FIG. 8, it shows the frequency spectrum analysis diagram of the decreasing amount of the DC Bus capacitor current through employing the double-frequency technique. That is the difference between the effective values of the capacitor current before and after employing that technique. As seen in FIG. 8, the positive portions of the diagram represent the decreasing amount from employing that technique and which represent the advantages of the present invention. The negative portions of the diagram represent the increasing of the harmonics in certain part of the frequency spectrum from employing that technique. But in total, the high-frequency current component is decreased.

Although the above-mentioned analysis is only implemented according to a specified application condition, but the operational principles and the advantages are relatively apparent. Which can be applied to other application conditions easily, and the main circuit configuration would have the same advantages over those circuits proposed in the prior arts.

The main circuit configuration as shown in FIG. 4 is the first embodiment of the present invention. In which, the input voltage source could be either the DC voltage source, or a voltage source having AC component. That is to say, the front-end could be either a PFC circuit, or a boost DC-DC converter circuit. Besides, the power switch element is not limited to MOSFET. Furthermore, the two inductors $L_a$ and $L_b$ can be coupled to each other. Also, the back-end phase-shifted full-bridge circuit included the configuration of having no capacitor $C_b$. Lastly, the back-end DC-DC converter unit can be the non-phase-shifted full-bridge circuit.

Figure 9:
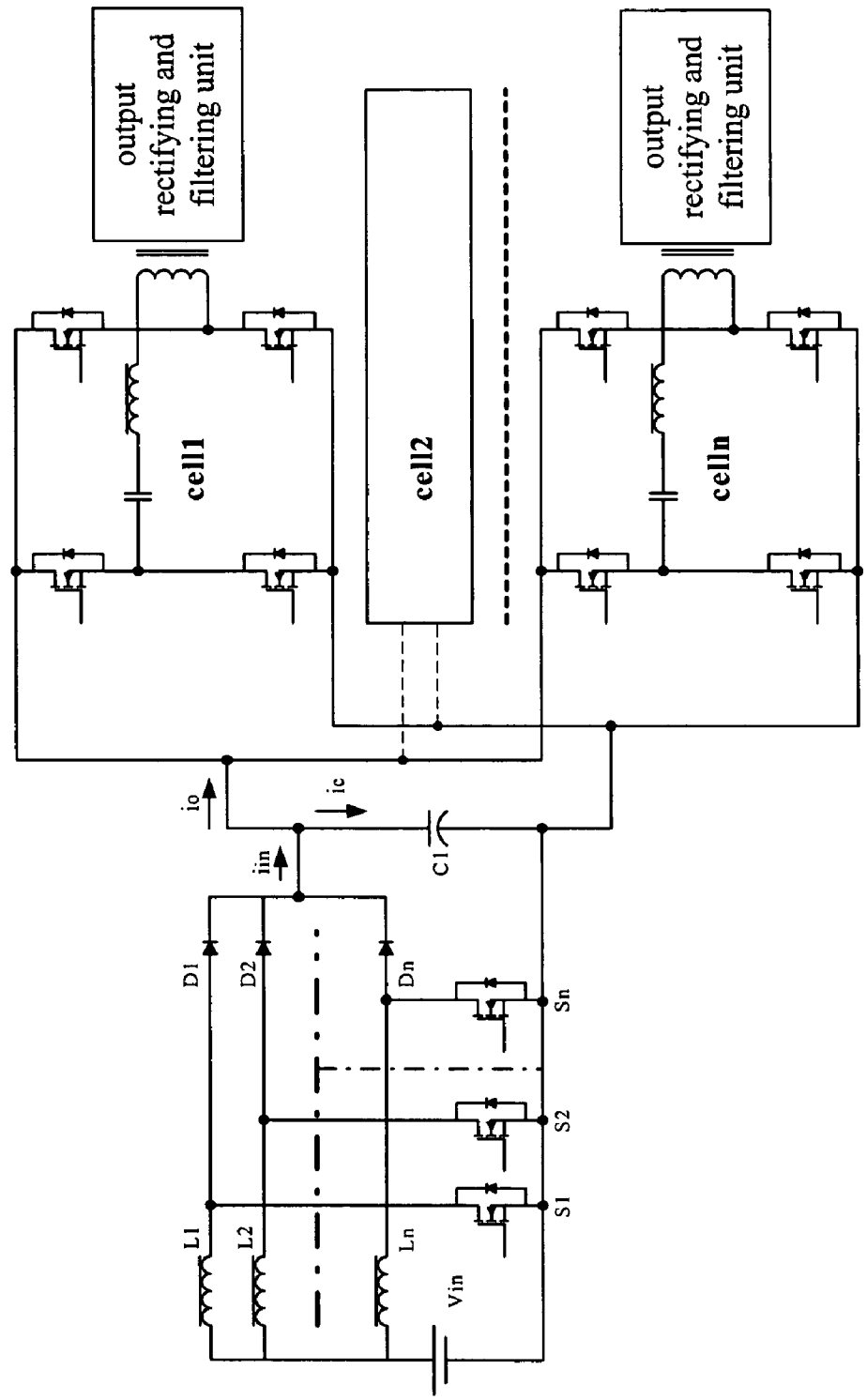
FIG. 9 is the schematic circuit diagram of the second preferred embodiment having multiple structures in the front-end and the back-end of the present invention.

Except for dual structures as shown in FIG. 4, the multiple structures of the front-end and the relative control method are also included as the preferred embodiment of the present invention. Referring to FIG. 9, which shows the schematic circuit diagram of the second preferred embodiment having multiple structures both in the front-end and the back-end of the present invention.

The system having the above-mentioned two-stage configurations as its subsystems is also included as the preferred embodiment of the present invention.

In conclusion, employing the main circuit topology of the present invention, and combining the double-frequency PFC circuit with the phase-shifted full-bridge DC-DC converter, the effective value of the DC Bus capacitor current can be decreased effectively so as to decrease the losses of the capacitor, to decrease the volume of the capacitor of the DC Bus, to further increase the power density of the DC-DC converter circuit, and to improve the efficiency of the DC-DC converter circuit.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A DC-DC converter circuit for reducing a DC bus capacitor current, comprising:
   a double frequency boost converter circuit having two boost converter circuits electrically connected in parallel, wherein two switches respectively disposed on said two boost converter circuits are turned on and off alternately to produce an output current having a frequency twice that of control signals of said two switches, and to offer a DC bus respectively;
   a full-bridge DC-DC converter connected to an output terminal of said double frequency boost converter circuit for transforming an output of said DC bus to a DC voltage; and
   a DC bus capacitor electrically connected to said double frequency boost converter circuit and said full-bridge DC-DC converter in parallel for balancing two corresponding transient powers of said double frequency boost converter circuit and said full-bridge DC-DC converter respectively.

2. The circuit according to claim 1, wherein said double frequency boost converter circuit comprises:
   a first boost converter circuit, comprising:
      a first inductor having a first terminal electrically connected to a first terminal of a DC power source;
      a first diode having an anode electrically connected to a second terminal of said first inductor; and
      a first switch having a first terminal electrically connected to said second terminal of said first inductor, and a second terminal electrically connected to a second terminal of said DC power source; and
   a second boost converter circuit, comprising:
      a second inductor having a first terminal electrically connected to said first terminal of said DC power source;
      a second diode having an anode electrically connected to a second terminal of said second inductor; and
      a second switch having a first terminal electrically connected to said second terminal of said second inductor, and a second terminal electrically connected to said second terminal of said DC power source.

3. The circuit according to claim 2, wherein said first and said second switches are alternately turned on and off with a difference of 180 degrees phase angles.

4. The circuit according to claim 1, wherein said full-bridge DC-DC converter is one of a phase-shifted full-bridge DC-DC converter and a non-phase-shifted full-bridge DC-DC converter.

5. A DC-DC converter circuit for reducing a DC bus capacitor current, comprising:
   a double frequency PFC circuit having two PFC circuits electrically connected in parallel, wherein two switches respectively disposed on said two boost converter circuits are turned on and off alternately to produce an output current having a frequency twice that of control signals of said two switches, and to offer a DC bus;
   a full-bridge DC-DC converter electrically connected to an output terminal of said double frequency PFC circuit for transforming an output of said DC bus to a DC voltage; and
   a DC bus capacitor electrically connected to said double frequency PFC circuit and said full-bridge DC-DC converter in parallel for balancing two corresponding transient powers of said double frequency PFC circuit and said full-bridge DC-DC converter respectively.

6. The circuit according to claim 5, wherein said first and said second switches are alternately turned on and off with a difference of 180 degrees phase angles.

7. The circuit according to claim 5, wherein said full-bridge DC-DC converter is one of a phase-shifted full-bridge DC-DC converter and a non-phase-shifted full-bridge DC-DC converter.

8. A method for reducing a DC bus capacitor current of a DC-DC converter circuit, wherein said DC-DC converter circuit comprises a full-bridge DC-DC converter electrically connected to a DC bus for transforming an output of said DC bus to a DC voltage and a DC bus capacitor electrically connected to said full-bridge DC-DC converter in parallel, comprising the step of: employing an output current of said DC bus having a frequency twice a switching frequency of the DC-DC converter to reduce said DC bus capacitor current.

9. The circuit according to claim 8, wherein said full-bridge DC-DC converter is one of a phase-shifted full-bridge DC-DC converter and a non-phase-shifted full-bridge DC-DC converter.

10. A DC-DC converter circuit for reducing a DC bus capacitor current, comprising:

an n-tuple frequency boost converter circuit having n boost converter circuits electrically connected in parallel, wherein n switches respectively disposed on said n boost converter circuits are turned on and off alternately to produce an output current having a frequency n times that of control signals of said n switches, and to offer a DC bus;

a full-bridge DC-DC converter electrically connected to an output terminal of said n-tuple frequency boost converter circuit for transforming an output of said DC bus to a DC voltage; and a DC bus capacitor electrically connected to said n-tuple frequency boost converter circuit and said full-bridge DC-DC converter in parallel for balancing two corresponding transient powers of said n-tuple frequency boost converter circuit and said full-bridge DC-DC converter respectively.

11. A DC-DC converter circuit for reducing a DC bus capacitor current, comprising:

an n-tuple frequency PFC circuit having n PFC circuits electrically connected in parallel, wherein n switches respectively disposed on said n PFC circuits are turned on and off alternately to produce an output current having a frequency n times that of control signals of said n switches, and to offer a DC bus;

a full-bridge DC-DC converter electrically connected to an output terminal of said n-tuple frequency PFC circuit for transforming an output of said DC bus to a DC voltage; and a DC bus capacitor electrically connected to said n-tuple frequency PFC circuit and said full-bridge DC-DC converter in parallel for balancing two corresponding transient powers of said n-tuple frequency PFC circuit and said full-bridge DC-DC converter respectively.

* * * * *